(12) United States Patent
Johansson

(10) Patent No.: US 8,558,490 B2
(45) Date of Patent: Oct. 15, 2013

(54) ESTIMATION OF ACTUAL TORQUE IN AN ELECTRICAL MOTOR DRIVE

(75) Inventor: Per Rickard Johansson, Tyreso (SE)

(73) Assignee: Danaher Motion Stockholm AB (SE)

(*) Notice: Subject to any disclaimer, the term of this patent is extended or adjusted under 35 U.S.C. 154(b) by 29 days.

(21) Appl. No.: 13/308,477

(22) Filed: Nov. 30, 2011

(65) Prior Publication Data

US 2012/0146559 A1 Jun. 14, 2012

(30) Foreign Application Priority Data

Dec. 9, 2010 (EP) .................................. 10194311

(51) Int. Cl.
*H02P 21/00* (2006.01)

(52) U.S. Cl.
USPC ...... 318/400.02; 318/801; 318/803; 318/805; 318/811

(58) Field of Classification Search
USPC ............... 318/727, 138, 254, 800, 801–808, 318/400.02, 811
See application file for complete search history.

(56) References Cited

U.S. PATENT DOCUMENTS

| | | | |
|---|---|---|---|
| 6,509,711 B1* | 1/2003 | Zaremba ...................... | 318/800 |
| 7,193,387 B1* | 3/2007 | Lu et al. ...................... | 318/800 |
| 7,463,005 B2* | 12/2008 | Iura et al. ...................... | 318/727 |
| 7,586,286 B2* | 9/2009 | Cheng et al. .................. | 318/807 |
| 2006/0066275 A1* | 3/2006 | Thunes et al. ................ | 318/432 |

OTHER PUBLICATIONS

Song Chi, Position-Sensorless Control of Permanent Magnet Synchronous Machnies over wide speed range, 2007, The Ohio state University.*

Song Chi, Positiion-sensorless control of permanent magnet Synchronous Machines over wide speed range, 2007, the ohi State University, pp. 33-34, 41, 45, 51.*

* cited by examiner

*Primary Examiner* — Eduardo Colon Santana
*Assistant Examiner* — Bickey Dhakal
(74) *Attorney, Agent, or Firm* — Park, Vaughan, Fleming & Dowler, LLP

(57) ABSTRACT

It is presented a control device for driving an electric motor, wherein a drive control signal for the electric motor is arranged to be determined using a calculated rotor flux. A direct quadrature, dq, coordinate system relating to a rotor of the electric motor is used. The control device comprises a flux estimator arranged to determine the calculated rotor flux using a quadrature axis voltage, a measured direct axis current, a measured quadrature axis current, an angular velocity, stator resistance and a direct axis inductance and an actual torque calculator arranged to obtain an actual torque estimation using the calculated rotor flux, the measured direct axis current and the measured quadrature axis current. A corresponding method is also presented.

7 Claims, 2 Drawing Sheets

ESTIMATION OF ACTUAL TORQUE IN AN ELECTRICAL MOTOR DRIVE

RELATED APPLICATIONS

This application claims priority under 35 U.S.C. §119 to European Patent Application No. 10194311.6 entitled "Estimation of Actual Torque in an Electrical Motor Drive" by the same inventors as the instant application filed on 9 Dec. 2010.

FIELD OF INVENTION

The present invention relates generally to control of an electrical motor, and more particularly to improved actual torque estimation.

BACKGROUND

Using inverter type motor drive devices, electrical motors can be controlled more freely. Either torque or speed can be controlled using such devices.

The motor drive device can receive a reference torque as an input. To provide a complete control loop, an estimate of an actual torque of the controlled motor can be provided as a feedback variable.

The accuracy of the actual torque estimate is typically not very high due to that rotor flux varies with rotor temperature and between individual motors. This leads to reduced ability to control torque, power flow, DC voltage stability and engine point of operation. These are disadvantages in a typical hybrid system with electrical machines, combustion engine and dc link.

SUMMARY

An object of the present invention is thus to improve the accuracy of actual torque estimation in a control device for driving an electrical motor.

According to a first aspect of the invention, it is presented a control device for driving an electric motor, wherein a drive control signal for the electric motor is arranged to be determined using a calculated rotor flux. A direct quadrature, dq, coordinate system relating to a rotor of the electric motor is used. The control device comprises a flux estimator arranged to determine the calculated rotor flux using a quadrature axis voltage, a measured direct axis current, a measured quadrature axis current, an angular velocity, stator resistance and a direct axis inductance, an actual torque calculator arranged to obtain an actual torque estimation using the calculated rotor flux, the measured direct axis current, the measured quadrature axis current, the direct axis inductance and a quadrature axis inductance, and a controller arranged to control the motor based on the actual torque estimation.

By estimating the rotor flux using dynamic parameters, significant improvement in accuracy of the actual torque estimation is achieved. The improved actual torque estimation leads to more precise motor operation and thereby greater efficiency and less power loss, e.g. in a hybrid system.

The flux estimator may be arranged to determine the calculated rotor flux using the following formula:

$$\psi_R = \frac{u_q - R_S \cdot i_{q\_meas}}{\omega} - L_d \cdot i_{d\_meas}$$

The flux estimator may be arranged to determine the calculated rotor flux to be the most recent previously determined rotor flux when at least one of the measured direct axis current and the measured quadrature axis current is greater than a respective threshold current value.

The flux estimator may be is arranged to determine the calculated rotor flux to be the most recent previously determined rotor flux when the angular velocity is less than a threshold angular velocity value.

The flux estimator may be arranged to determine the calculated rotor flux using a measured angular velocity of the motor.

The calculated rotor flux may further comprise a reference torque calculator arranged to obtain an adjusted reference torque using the calculated rotor flux, a reference direct axis current and a reference quadrature axis current, wherein the adjusted reference torque is fed back to obtain improved correspondence between the actual torque and input torque to the control device.

The control device may be arranged to control the motor using voltage references by at least considering when the angular velocity is above a threshold angular velocity value and to control the motor using a direct axis reference current and a quadrature axis reference current by at least considering when the angular velocity is below the threshold angular velocity value.

A second aspect of the invention is a method for controlling an electric motor performed in a control device, wherein a direct quadrature, dq, coordinate system relates to a rotor of the electric motor. The method comprises the steps of: determining the calculated rotor flux using a quadrature axis voltage, a measured direct axis current, a measured quadrature axis current, an angular velocity, stator resistance and a direct axis inductance, obtaining, in an actual torque calculator, an actual torque estimation using the calculated rotor flux, the measured direct axis current, the measured quadrature axis current, the direct axis inductance and a quadrature axis inductance, and controlling the motor based on the actual torque estimation.

It is to be noted that any aspect of the first aspect may, when appropriate, be applied to the second aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF DRAWINGS

The invention is now described, by way of example, with reference to the accompanying drawings, in which.

DETAILED DESCRIPTION OF PREFERRED EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
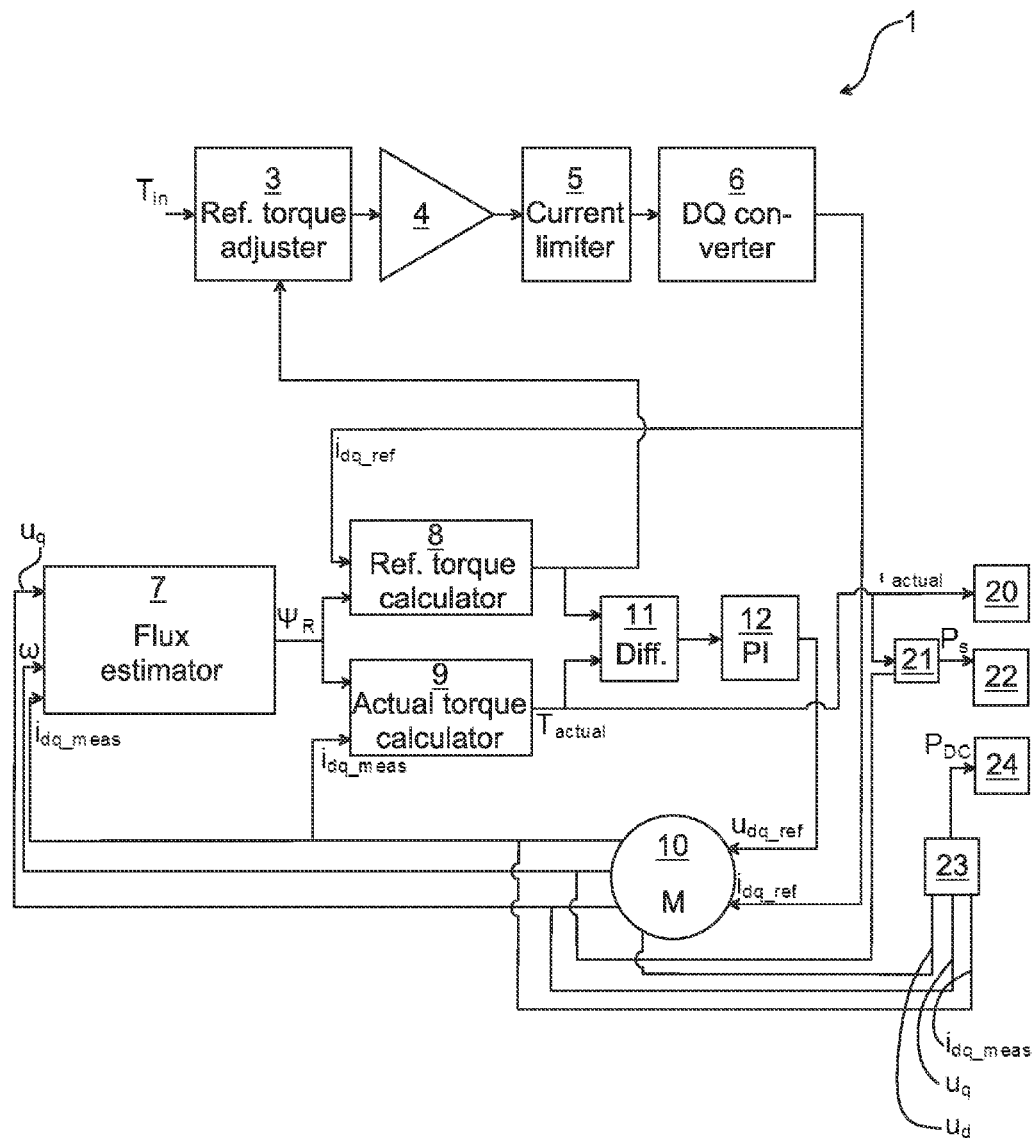
FIG. 1 is a schematic diagram of a motor drive device circuit according to an embodiment of the present invention.

FIG. 1 is a schematic diagram of a motor drive device 1 circuit according to an embodiment of the present invention. An input torque $T_{in}$ is input from an external source to the motor drive device 1. This external source could utilise any suitable communication protocol, e.g. a CAN-bus, other digital bus structures or using an analogue signal. The input torque $T_{in}$ may optionally previously have passed through a ramp limiter (not shown). When used, the ramp limiter has limited the rate of change of the input torque $T_{in}$ to ensure it stays within acceptable rates of change. $T_{in}$ is passed to a reference torque adjuster 3. This module also receives a calculated reference torque $T_{ref}$, which has been calculated using a dynamically calculated rotor flux, as will be explained in more detail below. Using the ramp limited $T_{in}$ and the calculated reference torque $T_{ref}$, the reference torque adjuster 3 outputs an adjusted reference torque.

A current converter 4 uses a fixed factor to convert the adjusted reference torque to a reference current. The reference current is fed to a current limiter 5 which may limit the current based on temperature, speed and/or DC voltage. The reason to limit based on DC voltage is to protect the application of the control device 1 from a DC voltage that is too high or too low. The DC voltage can shift with usage in systems with a small number of DC source devices or DC consumer devices. The current limiter 5 can for example use a lookup tables to obtain a limited current based on the control parameters temperature, speed and/or DC voltage. The output from the current limiter 5 is a limited current as a scalar representing the torque generating reference current.

The motor control uses rotor oriented references when controlling the current. That means that controlled current, measured current and voltages are represented in rotor fixed dq coordinate system, with the two axis being d and q for direct and quadrature.

A dq converter 6 divides the limited current into d current and q current components, in the dq coordinate system. Here, it is possible to optimise the torque in relation to total current when using motors with reluctance torque design. The output from the dq converter 6 comprises a reference current for the d axis, $i_{d\_ref}$ and a reference current for the q axis, $i_{q\_ref}$.

When the frequency of the motor is less than the nominal frequency, the two reference currents, $i_{d\_ref}$ and $i_{q\_ref}$ are fed as control signals to a motor system 10 connected to or included in the motor drive device 1. In other words, when the motor is in current control, these reference currents $i_{d\_ref}$ and $i_{q\_ref}$ are the main torque control parameter. The controlled motor system 10 comprises circuitry necessary to follow the reference currents $i_{d\_ref}$ and $i_{q\_ref}$ to the greatest extent possible and a connected motor.

The motor system 10 can comprise any suitable motor, e.g. induction motor, permanent magnet synchronous motor, with or without reluctance torque.

In addition, the two reference currents, $i_{d\_ref}$ and $i_{q\_ref}$ are fed to as inputs to a reference torque calculator 8.

Before describing a flux estimator 7, some theory on flux calculation will be presented. Motor equations under stationary conditions based on voltages can be expressed as follows:

$$0 = u_d - R_S \cdot i_{d\_meas} + \omega \cdot L_q \cdot i_{q\_meas} \quad (1a)$$

$$0 = u_q - R_S \cdot i_{q\_meas} - \omega \cdot L_d \cdot i_{d\_meas} - \omega \cdot \psi_R \quad (1b)$$

where $u_d$ and $u_q$ are the voltages on the d and q axis, respectively, $R_s$ is the stator resistance, $i_{q\_meas}$ is the measured current on the q axis, $i_{d\_meas}$ is the measured current on the d axis, $\omega$ is the angular velocity, $L_d$ and $L_q$ are the inductances on the d and q axis, respectively, and $\Psi_R$ is the rotor flux. The voltages $u_d$ and $u_q$ can for example be implemented using PWM (Pulse Width Modulation) resulting in voltages that can be obtained as references or measured.

Rearranging equation (1b) provides the following formula:

$$\psi_R = \frac{u_q - R_S \cdot i_{q\_meas}}{\omega} - L_d \cdot i_{d\_meas} \quad (2)$$

The flux estimator 7 estimates the rotor flux $\Psi_R$ using equation (2). The parameters $R_s$ and $L_d$ are pre-configured. All remaining inputs are dynamic. More specifically, $u_q$ is controller output and $\omega$, $i_{d\_meas}$ and $i_{q\_meas}$ are measured.

High angular velocity and low current are beneficial to the accuracy of equation (2). If the angular velocity is high then the quote between $u_q$ and $\omega$ is based on high values and the relative error of those variables becomes small. If the current is low, then the parameters $R_s$ and $L_d$ become less significant in the calculation. Since $R_s$ and $L_d$ are non-calibrated pre-defined parameters, it is an advantage to have them less significant.

Hence, the flux estimator 7 can optionally be arranged to determine the calculated rotor flux to be the most recent previously determined rotor flux when the angular velocity is less than a threshold angular velocity value. In other words, the previous value is maintained when the angular velocity drops too low.

Furthermore, the flux estimator 7 can optionally be arranged to determine the calculated rotor flux to be the most recent previously determined rotor flux when at least one of the measured direct axis current and the measured quadrature axis current is greater than a respective threshold current value. In other words, the previous value is maintained when the any one of the measured currents grow too large.

The rotor flux output from the flux estimator 7 is fed to the reference torque calculator 8 and an actual torque estimator 9.

The reference torque calculator 8 uses the inputs of reference currents and the rotor flux to calculate a reference torque $T_{ref}$ which takes into account the current rotor flux. This calculated reference torque $T_{ref}$ is fed to the reference torque adjuster 3. Using this feedback, a better correspondence between input torque (Tin) and actual torque is achieved. The reference torque adjuster 3 compensates for the inaccurately assumed static relation between current and torque made in the current converter 4. The reference torque adjuster 3 adds just as much torque needed to the input of current converter 4 to achieve that $T_{ref}$ reach the value of Tin. One reason for a non static relation between current and torque can be the change in rotor flux during operation due to rotor temperature change etc.

The actual torque estimator 9 uses the inputs of measured currents, $i_{d\_meas}$ and $i_{q\_meas}$, and the rotor flux to estimate an actual torque $T_{actual}$ produced by the motor.

A differentiator 11 calculates a difference between the reference torque $T_{ref}$ and the estimated actual torque $T_{actual}$ and feeds this to a PI regulator 12. The PI regulator 12 feeds the angle between the reference voltages in the dq plane, $u_{d\_ref}$ and $u_{q\_ref}$ to the motor system 10 to achieve equality between $T_{ref}$ and $T_{actual}$. The voltage references $u_{d\_ref}$ and $u_{q\_ref}$ are used to control the motor system 10 when the motor is in field weakening. When not in field weakening $i_{d\_ref}$ and $i_{q\_ref}$ are used to control the motor system. In this way, the PI regulator 12 acts as a controller to control the motor system 10.

The actual torque estimator 9 also provides the actual torque estimate $T_{actual}$ as a first output 20 for external use.

Furthermore, by feeding the actual torque estimate $T_{actual}$ and the angular velocity ω to a combiner 21, an actual shaft power estimate $P_s$ is provided as a second output 22 for external use.

Also an optional DC power calculator 23 uses inputs for measured currents on the d and q axes $i_{d\_meas}$ and $i_{q\_meas}$ and voltage references on the d and q axes $u_d$ and $u_d$ to obtain a DC power value $P_{DC}$. This value $P_{DC}$ is optionally provided on a third output 24 for external use.

In the prior art of this technical field, the rotor flux was statically configured. By estimating the rotor flux using dynamic parameters and equation (2) in the flux estimator 7, significant improvement in accuracy of the actual torque estimation is achieved. Experiments have shown that previous inaccuracies of 15-20 percent can be halved by introducing the flux estimator 7.

Figure 2:
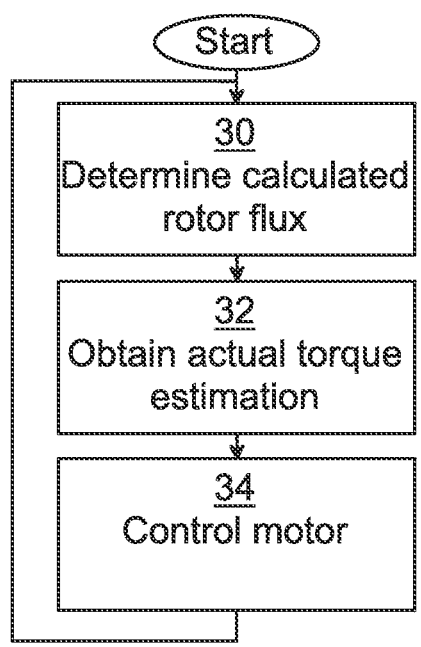
FIG. 2 is a flow chart illustrating a method according to embodiments presented herein.

FIG. 2 is a flow chart illustrating a method according to embodiments presented herein. The method is thus used for controlling an electric motor.

In an initial determine calculated rotor flux step 30, the calculated rotor flux is determined using a quadrature axis voltage, a measured direct axis current, a measured quadrature axis current, an angular velocity, stator resistance and a direct axis inductance.

In an obtain actual torque estimation step 32 an actual torque estimation is obtained in an actual torque calculator using the calculated rotor flux, the measured direct axis current, the measured quadrature axis current, the direct axis inductance and a quadrature axis inductance.

In a control motor step 34, the motor is controlled based on the actual torque estimation.

The method is then repeated for further control iterations.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A control device for driving an electric motor, wherein a drive control signal for the electric motor is arranged to be determined using a calculated rotor flux, wherein a direct quadrature (dq) coordinate system relates to a rotor of the electric motor, wherein the control device comprises:
    a flux estimator arranged to determine the calculated rotor flux using a quadrature axis voltage, a measured direct axis current, a measured quadrature axis current, an angular velocity, stator resistance and a direct axis inductance,
    an actual torque calculator arranged to obtain an actual torque estimation using the calculated rotor flux, the measured direct axis current and the measured quadrature axis current, the direct axis inductance and a quadrature axis inductance,
    a controller arranged to control the motor based on the actual torque estimation, and
    a reference torque calculator arranged to obtain an adjusted reference torque using the calculated rotor flux, a reference direct axis current and a reference quadrature axis current, wherein the adjusted reference torque is fed back to a reference torque adjuster to obtain improved correspondence between the actual torque estimation and an input torque to the control device.

2. The control device according to claim 1, wherein the flux estimator is arranged to determine the calculated rotor flux using the following formula:

$$\psi_R = \frac{u_q - R_S \cdot i_{q\_meas}}{\omega} - L_d \cdot i_{d\_meas}.$$

3. The control device according to claim 1, wherein the flux estimator is arranged to determine the calculated rotor flux to be the most recent previously determined rotor flux when at least one of the measured direct axis current and the measured quadrature axis current is greater than a respective threshold current value.

4. The control device according to claim 1, wherein the flux estimator is arranged to determine the calculated rotor flux to be the most recent previously determined rotor flux when the angular velocity is less than a threshold angular velocity value.

5. The control device according to claim 1, wherein the flux estimator is arranged to determine the calculated rotor flux using a measured angular velocity of the motor.

6. The control device according to claim 1, arranged to control the motor using a voltage reference by at least considering when the angular velocity is above a threshold angular velocity value, and to control the motor using a direct axis reference current and a quadrature axis reference current by at least considering when the angular velocity is below the threshold angular velocity value.

7. A method for controlling an electric motor performed in a control device, wherein a direct quadrature (dq) coordinate system relates to a rotor of the electric motor, the method comprising the steps of:
    determining the calculated rotor flux using a quadrature axis voltage, a measured direct axis current, a measured quadrature axis current, an angular velocity, stator resistance and a direct axis inductance,
    obtaining, in an actual torque calculator, an actual torque estimation using the calculated rotor flux, the measured direct axis current, the measured quadrature axis current, the direct axis inductance and a quadrature axis inductance,
    controlling the motor based on the actual torque estimation, and
    obtaining, in a reference torque calculator, an adjusted reference torque using the calculated rotor flux, a reference direct axis current and a reference quadrature axis current, wherein the adjusted reference torque is fed back to a reference torque adjuster to obtain improved correspondence between the actual torque estimation and an input torque to the control device.

* * * * *